Nov. 23, 1965

W. SARAGA 3,219,952

ACTIVE ELECTRICAL ONE-PORTS

Filed July 16, 1962

2 Sheets-Sheet 1

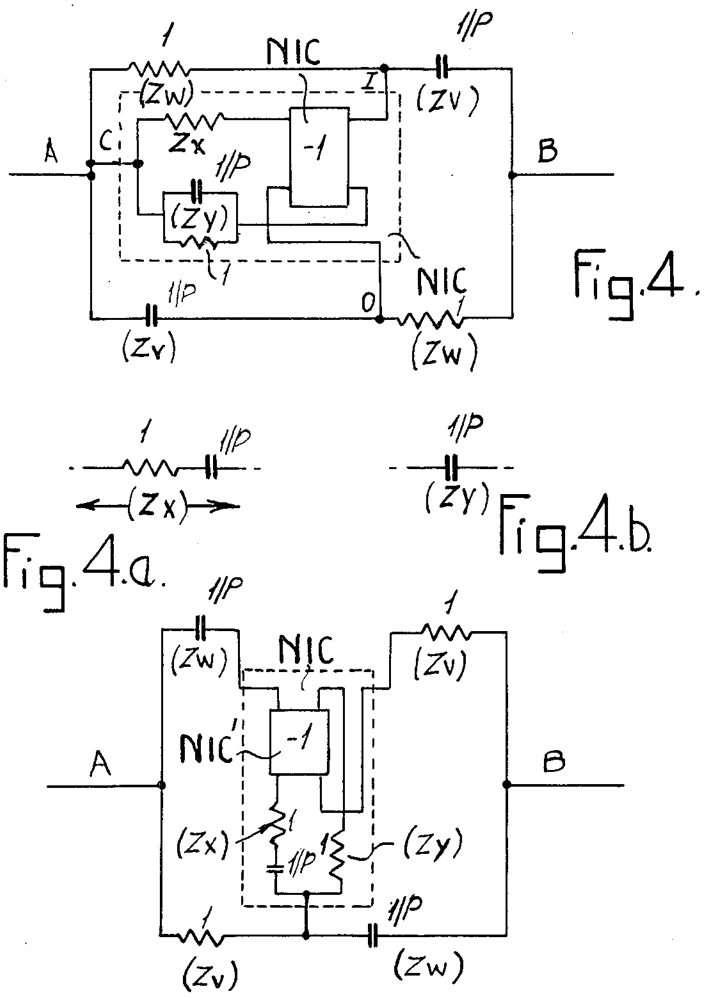
Fig. 4. Fig. 4.a. Fig. 4.b. Fig. 5.

United States Patent Office 3,219,952 Patented Nov. 23, 1965

3,219,952

ACTIVE ELECTRICAL ONE-PORTS

Wolja Saraga, Petts Wood, Orpington, Kent, England, assignor to Associated Electrical Industries Limited, London, England, a British company Filed July 16, 1962, Ser. No. 209,924
Claims priority, application Great Britain, July 17, 1961, 25,806/61
3 Claims. (Cl. 333—80)

This invention relates to active electrical two-terminal networks (one-ports) of the type described by I. W. Sandberg in his paper, "Synthesis of Driving-Point Impedances With Active RC Networks," published in the Bell System Technical Journal, vol. 39 (July 1960), pp. 947–962. Such active networks will herein be called the Sandberg type and comprise a bridge circuit incorporating two passive RC one-ports having a first impedance which will herein be denoted by $Z_V$ these two impedances being connected in opposite arms of the bridge, two passive RC one-ports having a second impedance $Z_W$ connected in the other two arms, the two terminal points of the overall network being at opposite corners of the bridge, and an active three-terminal two-port constituted by a negative impedance converter having a conversion ratio (input/output) of $-Z_X/Z_Y$ where $Z_X$ and $Z_Y$ are the impedances of passive RC one-ports, this conversion ratio signifying that if the converter is terminated at its output port by impedance $Z_O$, say, the impedance at its input port is $(-Z_X/Z_Y)Z_O$: conversely, if the converter is terminated at its input port by impedance $Z_O$ the impedance at the output port is $(-Z_Y/Z_X)Z_O$.

An RC one-port is one consisting only of resistance elements (R) or capacitance elements (C) or a combination of resistance and capacitance elements, with no inductance elements. A three-terminal two-port is one having an input terminal point, an output terminal point and a common terminal point of which the input point and common point together constitute the input port, while the output point and common point together constitute the output port.

In further considering the invention and the theoretical considerations on which it is based, reference will be made to the accompanying drawings in which:

FIG. 4 represents in partially schematic form an active network according to one form of the invention;

Figures 1, 2:
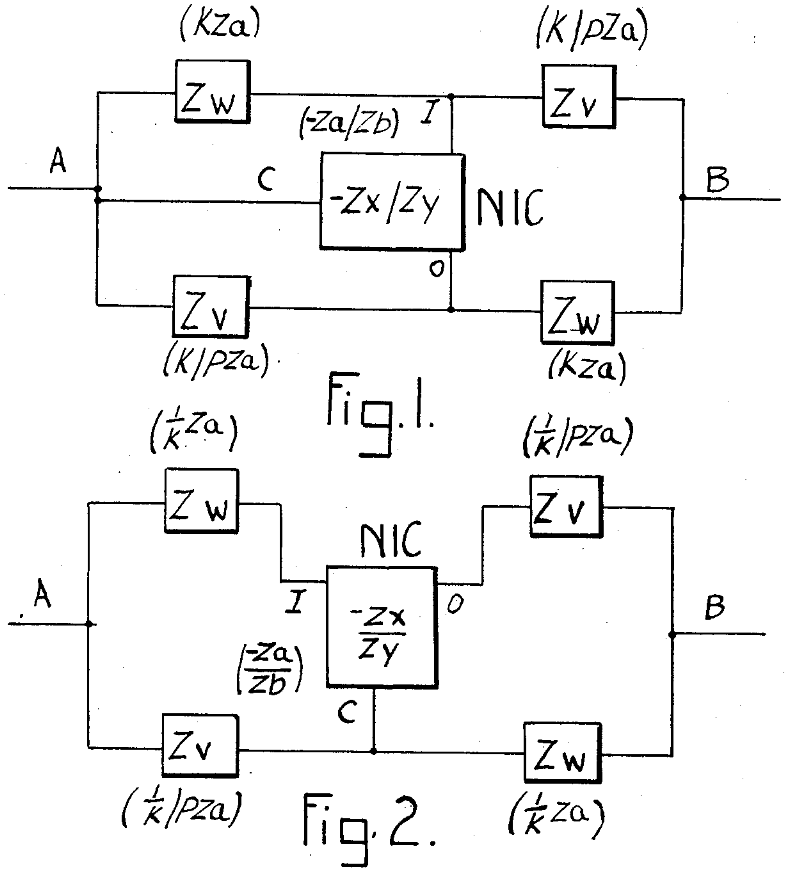
FIGS. 1 and 2 represent in block form active networks of the Sandberg type.

FIGS. 4*a* and 4*b* represent alternative realizations for the impedances $Z_X$ and $Z_Y$ of FIG. 4;

FIG. 5 represents in partially schematic form an active network according to another form of the invention.

An active network of the Sandberg type herein considered may take one of two forms. In one form the $Z_V$ and $Z_W$ one-ports are connected directly between adjacent corners of the bridge and the three-terminal negative impedance converter has its common terminal point connected to one of the terminal points of the network, with its input port connected across the adjacent $Z_W$ one-port and its output port connected across the adjacent $Z_V$ one-port. In the other form one of the $Z_W$ one-ports is connected between one of the network terminal points and the input terminal point of the negative impedance converter, one of the $Z_V$ one-ports is connected between the other of the network terminal points and the output terminal point of the converter, the bridge arms which include these two one-ports therefore also partially including the converter, and the common terminal point of the converter is connected to the corner of the bridge at the junction of the remaining two one-ports. These two forms of the Sandberg type active RC network are illustrated in the accompanying drawings in FIGS. 1 and 2 respectively, in which points A and B are the terminal points of the network and points I, O and C are respectively the input, output, and common terminal points of the negative impedance converter NIC of input/output conversion ratio $-Z_X/Z_Y$. To facilitate comparison with the networks as illustrated by Sandberg in his paper referred to above, it should be noted that the impedances $Z_V$, $Z_W$, $Z_X$, and $Z_Y$ correspond to Sandberg's impedances $Z_1$, $Z_2$, $Z_3$, and $Z_4$ respectively for the first form of his network, and to Sandberg's impedances $Z_6$, $Z_5$, $Z_8$, and $Z_7$ respectively for the second form.

It is possible to obtain between the terminal points of active networks of the Sandberg type, impedances $Z(p)$ (that is, impedances Z which are a function of a complex frequency variable $p$), which without the use of active elements could only be produced, if at all, by passive networks including one or more inductance elements.

In the synthesis method propounded by Sandberg for his type of network in the paper referred to above, there is a significant theoretical restriction in that impedance functions $Z(p)$ which are non-positive on the entire negative real $p$-axis are not obtainable without the addition of other circuit elements external to the basic bridge circuit. Thus for example, to obtain an impedance function $Z(p)$ that is non-positive on the entire negative real $p$-axis, the function $Z'(p)=Z(p)-Z_S$, where $Z_S=a/p$ or $a/(p+b)$ and $a$ and $b$ are positive constants, can be realized by the basic Sandberg type network [$Z'(p)$ not being non-positive on the entire negative real $p$-axis] and $Z(p)$ can then be realized as the series combination of $Z'(p)$ and an additional RC one-port of impedance $Z_S$. Alternatively the function $-Z(p)$, which is obviously not non-positive over the stated range, could be realized by the basic Sandberg type network and $Z(p)$ then realized by using an additional negative impedance converter with a conversion ratio of —1 terminated by the bridge network of impedance $-Z(p)$.

It is an object of the present invention to provide an active two-terminal network of the Sandberg type in which the impedance relationships, determined by a different synthesis method, are such that without the addition of external circuit elements to the basic bridge circuit, impedance functions $Z(p)$ including functions that are non-positive on the entire negative real p-axis can be obtained. A network synthesised in accordance with the invention to give an impedance function that is non-positive on the entire negative real $p$-axis, has the advantage of requiring, in general, fewer components than required by Sandberg's synthesis: for other impedance functions the number of components may be the same, but it can be shown that the component values will be different. The mere fact that a network in accordance with the invention can provide a required impedance function using different component values is itself an advantage because it lends greater flexibility to the design of such networks and creates a greater field of choice for the network designers.

According to the present invention an active two-terminal network of the Sandberg type presenting an impedance function $Z(p)$ and comprising bridge impedances $Z_V$ and $Z_W$ and a negative impedance converter of conversion ratio $-Z_X/Z_Y$ as aforesaid is realized with $Z_V=k'/pZ_a$, $Z_W=k'Z_a$, and $-Z_X/Z_Y=-Z_a/Z_b$ where $Z_a$, $Z_b$ and $1/pZ_a$ are the impedances of passive RC one-ports, and where $k(Z_a-Z_b)/(1-pZ_aZ_b)$ equals $Z(p)$ for the first form of the Sandberg type network and equals $1/pZ(p)$ for the second form, and $k'$ equals $k$ for the first form and $1/k$ for the second form, $k$ being a (positive or negative) real constant. It can be shown mathematically that in general for any real rational impedance function $Z''(p)$ including functions which are non-positive on the entire negative real $p$-axis, passive RC impedance functions $Z_a$ and $Z_b$ can be found which satisfy the expression $Z''(p)=k(Z_a-Z_b)/(1-pZ_aZ_b)$ for any positive or negative value of $k$. This therefore applies specifically for $Z''(p)=Z(p)$ and $Z''(p)=1/pZ(p)$ in the present instance.

The impedance functions $Z_a$ and $Z_b$ needed to give a required impedance function $Z''(p)$ [being for the present purposes $Z(p)$ or $1/pZ(p)$ as the case may be] can be determined from the expressions $$Z_a=-\frac{(Q_a)_o}{q(Q_a)_e} \text{ and } Z_b=\frac{(Q_b)_o}{q(Q_b)_e}$$

where $q=p^{1/2}$, $(Q_a)_e$ and $(Q_a)_o$ are the even and odd parts respectively of $Q_a$, $(Q_b)_e$ and $(Q_b)_o$ are the even and odd parts respectively of $Q_b$, and $Q_a$ and $Q_b$ are polynomials in $q$ defined by $$Q_a=\prod_a(q-q_a) \text{ and } Q_b=\prod_b(q-q_b)$$

where II is a symbol denoting a product extending over all values of the subscript ($a$ or $b$), $q_a$ or $q_b$ being the one points of $qZ''/k$ (that is the points in the $q$-plane at which $qZ''/k$ is equal to $+1$) in the right half and left half respectively of the $q$-plane, and where in those cases in which $qZ''/k$, considered as a rational function of $q$, has a common factor $q$ in its numerator and denominator polynomials, the expression given above for $Q_a$ or, if desired, that for $Q_b$, is multiplied by $q$ to become $$q=\prod_a(q-q_a) \text{ or } q\prod_b(q-q_b)$$

as the case may be.

The procedure for determining $Z_a$ and $Z_b$ for a required impedance function $Z(p)$ can then be as follows: depending on the particular form of Sandberg type network to be used, take $Z''=Z(p)$ or $1/pZ(p)$, decide on on a value for $k$ and multiply $Z''$ by $q/k$ to get $qZ''/k$. Find the one-points of $qZ''/k$, any common factor $q$ in the numerator and denominator not being cancelled, and separate the one-points lying in the right hand half of the $q$-plane (denoted by $q_a$) from those in the left hand half (denoted by $q_b$). Form the polynomials $$Q_a=\prod_a(q-q_a) \text{ and } Q_b=\prod_b(q-q_b)$$

(remembering to multiply the R.H.S. of one of them by $q$ in the circumstance mentioned above) and separate them into their even parts $(Q_a)_e$, $(Q_b)_e$ and odd parts $(Q_a)_o$, $(Q_b)_o$ in accordance with $Q_a=(Q_a)_e+(Q_a)_o$ and $Q_b=(Q_b)_e+(Q_b)_o$. Thence derive $Z_a$ and $Z_b$ from the expressions given for them above.

An alternative procedure for obtaining the polynomials $Q_a$ and $Q_b$ required for the derivation of $Z_a$ and $Z_b$ from the expressions given is as follows: Express $qZ''/k$ as $N/D$, where N and D are polynomials, and evaluate the zeros of $(N-D)$. These zeros will be identical with the one-points of $qZ''/k$ except that when N and D have a common factor of $q$ this will give rise to a zero of $(N-D)$ at $q=0$, which is not a true one-point of $qZ''/k$. Denoting the zeros in the right half plane by $q_a$ and those in the left half plane by $q_b$, a zero at $q=0$ being associated with either the $q_a$ zeros or the $q_b$ zeros, the polynomials $Q_a$ and $Q_b$ are defined as before by $$Q_a=\prod_a(q-q_a) \qquad Q_b=\prod_b(q-q_b)$$

but this time no multiplication of $Q_a$ or $Q_b$ is required if $qZ''/k$ considered as a rational function of $q$ has a common factor in its numerator and denominator: this is because this has been implicitly done already by associating the zero at $q=0$ with either the $q_a$ zeros or the $q_b$ zeros.

Having calculated $Z_a$ and $Z_b$ (which it will be appreciated are normalized impedance functions as are also the other impedance functions referred to herein), the values of the RC components necessary to realize $kZ_a$ and $k/pZ_a$ for the FIG. 1 form of network and $Z_a/k$ and $1/kpZ_a$ for the FIG. 2 form can be found by well known methods. The factor $k$ can be chosen so as to simplify the numerical work involved in finding $Z_a$ and $Z_b$, to minimize the number of components or the number of capacitors required in the final network, or to minimize the sensitivity of the circuit performance to variations of element values in the passive or active parts of the network or to the effect of parasitic elements. $k$ is not merely a scale factor, because the one-points of $qZ''/k$ vary in a complicated way with $k$, so that $Z_a$ and $Z_b$, which depend on the one-points, will do so also.

In FIGS. 1 and 2, the realization of $Z_V$, $Z_W$ and $Z_X/Z_Y$ in terms of $Z_a$, $Z_b$, $p$ and $k$ according to the invention has been indicated in brackets. The complex frequency variable $p$ can be defined as $jf/f_{ref}$ where $f$ is the actual frequency and $f_{ref}$ is an arbitrary but fixed reference frequency measured in the same units as $f$. Taking $Z_{AB}$ as the impedance between terminal points A and B of the network, then as indicated above $$k(Z_a-Z_b)/(1-pZ_aZ_b)=Z_{AB}$$

for FIG. 1 and $1/pZ_{AB}$ for FIG. 2.

The network of FIG. 1 could be realized by interchanging the $kZ_a$ and $k/pZ_a$ impedance functions and by inverting at the same time the conversion ratio of the negative impedance converter NIC from $-Z_a/Z_b$ to $-Z_b/Z_a$. However with this inversion it will be seen that if, as previously indicated, the port I–C is now taken as the output port, and the port O–C as the input port, the input/output conversion ratio is still $-Z_a/Z_b$ with the input port connected across the $kZ_a$ impedance. Therefore the resulting circuit could be considered as being the same as FIG. 1 but drawn in a different way. Similar considerations apply to FIG. 2.

The theory and constitution of negative impedance converters having a conversion ratio $-Z_X/Z_Y$ are discussed in Sandberg's paper described above and such converters may in general embody a negative impedance converter of ratio $-1$ (of which different forms are known) embedded in a circuit containing also two passive RC one-ports of impedance $Z_X$ and $Z_Y$ respectively. For instance as illustrated in block form in FIG. 3, the negative impedance converter NIC of conversion ratio $-Z_X/Z_Y$ may be constituted by a voltage inversion negative impedance converter NIC' of conversion ratio $-1$ as described by Linvill in his paper "Negative Impedance Converters," published in the Proceedings of the Institute of Radio Engineers, vol. 41, June 1953, page 725 ff., together with impedance functions $Z_X$ and $Z_Y$ connected as shown.

To obtain the conversion ratio $-Z_X/Z_Y=-Z_a/Z_b$ as required according to the present invention, $Z_X$ and $Z_Y$ may be taken equal to $GZ_a$ and $GZ_b$ respectively or to $G/pZ_b$ and $G/pZ_a$ respectively, where G is an arbitrary positive real constant or is some arbitrary function of $p$ chosen such as to meet the requirement of $Z_X$ and $Z_Y$ being passive RC impedance functions.

Concerning the determination of $Q_a$ and $Q_b$ it is worth noting that in some cases it is possible to recognize these directly by inspection of the equation $qZ(p)=1$ instead of forming them from the individual $q_a$ and $q_b$ as explained above. This will be demonstrated for the following example.

To give a specific example, let a network of the form of FIG. 1 be required having a normalized impedance $Z_{AB}=p$, which is non-positive on the entire negative real $p$-axis. Using the procedure outlined previously and taking $k=1$, one gets $$qZ''/k=qZ_{AB}/k=q^3$$

(recalling that $p=q^2$).
The one-points of this are:

$$q_a=1$$

and $$q_b=-\frac{1}{2}\pm j\frac{1}{2}\sqrt{3}$$

from which, after determining $Q_a$ and $Q_b$ from these one-points, one gets:

$$Z_a=1$$

and $$Z_b=1/(1+p)$$

giving $Z_V=1/p$ and $Z_W=1$.
Also taking $Z_X=GZ_a$ and $Z_Y=GZ_b$ as above and choosing $G=1$, one gets:

$$Z_X=1$$

and $$Z_Y=1/(1+p)$$

This example could have been worked out without actually determining the one-points because $q^3-1=0$ (i.e. $qZ_{AB}/k=q^3=1$) can be rewritten $$(q-1)\ (q^2+q+1)=0$$

giving $Q_a=(q-1)$ and $Q_b=(q^2+q+1)$ directly.

Figure 3:
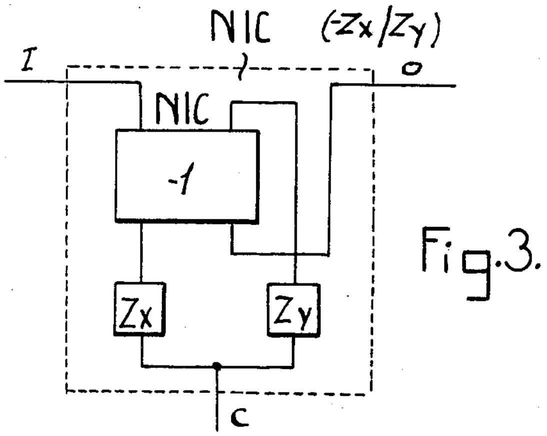
FIG. 3 represents in block form a known active network employing a negative impedance converted with a conversion ratio —1.

The resulting network using the negative impedance converter of FIG. 3 is shown in FIG. 4, this realization requiring only four resistors and three capacitors, which can be shown to be significantly less than the result obtained by the prior mode of synthesis for the same overall impedance $Z_{AB}=p$. Alternative realizations for $Z_X$ and $Z_Y$ in the same example, derived by taking $Z_X=G/pZ_b$ and $Z_Y=G/pZ_a$ with $G=1$ are:

$$Z_X=1+1/p \text{ (FIG. 4a)}$$

and $$Z_Y=1/p \text{ (FIG. 4b)}$$

To take the same example ($Z_{AB}=p$) for the form of network of FIG. 2, with $k=1$ one gets:

$$qZ''/k=q/kpZ_{AB}=q/q^4=1/q^3$$

(noting the common factor) with the one-points $q_a=1$ and $q_b=-\frac{1}{2}\pm j\angle\frac{3}{2}$ from which, if $Q_a$ is multiplied by $q$ rather than $Q_b$ $$Z_a=1/p$$

and $$Z_b=1/(1+p)$$

so that $Z_V=1$, $Z_W=1/p$ and alternative solutions for $Z_X$ and $Z_Y$ are $1/p$ and $1/(1+p$ or $1+1/p$ and 1, the resulting network being as shown in FIG. 5, taking the second of the alternatives for $Z_X$ and $Z_Y$.

What I claim is:

1. An active two-terminal network of the Sandberg type presenting an impedance function $Z(p)$ and comprising a four-arm bridge circuit having passive RC one-ports of impedance $Z_V$ in two opposite arms thereof and passive RC one-ports of impedance $Z_W$ in its other two arms, together with a three-terminal negative impedance converter of conversion ratio $-Z_X/Z_Y$ connected to the bridge circuit to form such Sandberg type network in one of the two possible forms thereof, characterised in that the network is realized with $Z_V=k'/pZ_a$, $Z_W=k'Z_a$ and $-Z_X/Z_Y=-Z_a/Z_b$, where $Z_X$, $Z_Y$, $Z_a$, $Z_b$ and $1/pZ_a$ are the impedances of passive RC one-ports, and the terms $k(Z_a-Z_b)/(1-pZ_aZ_b)$ and $k'$ respectively equal $Z(p)$ and $k$ or $1/pZ(p)$ and $1/k$ according to the particular form of the network, $k$ being a real constant.

2. An active network as claimed in claim 1 wherein the negative impedance converter comprises a negative impedance converter of conversion ratio $-1$ to which are connected two passive RC one-ports of impedance $Z_X=GZ_a$ and $Z_Y=GZ_b$ respectively in such manner as to give an overall conversion ratio $-Z_X/Z_Y=-Z_a/Z_b$, where G is an arbitrary positive real constant or function of $p$ chosen to meet the requirement that $Z_X$ and $Z_Y$ be passive RC impedances.

3. An active network as claimed in claim 1 wherein the negative impedance converter comprises a negative impedance converter of conversion ratio $-1$ to which are connected two passive RC one-ports of impedance $Z_X=G/pZ_b$ and $Z_Y=G/pZ_a$ respectively in such manner as to give an overall conversion ratio $-Z_X/Z_Y=-Z_a/Z_b$, where G is an arbitrary positive real constant or function of $p$ chosen to meet the requirement that $Z_X$ and $Z_Y$ be passive RC impedances.

References Cited by the Examiner

IRE Transactions on Circuit Theory, vol. CT-3-4, September 1957, pp. 124-144.

MILTON O. HIRSHFIELD, *Primary Examiner.*

LLOYD McCOLLUM, *Examiner.*